(12) United States Patent
Dewhurst et al.

(10) Patent No.: US 7,274,992 B2
(45) Date of Patent: Sep. 25, 2007

(54) METHOD FOR PREDICTING PORE PRESSURE

(75) Inventors: David Dewhurst, Kingsley (AU); Anthony Frederick Siggins, Applecross (AU); Radim Ciz, Burswood (AU); Milovan Urosevic, Wembley (AU); Kevin Dodds, Doubleview (AU)

(73) Assignee: Commonwealth Scientific and Industrial Research Organisation, Australian Capital Territory (AU)

( * ) Notice: Subject to any disclaimer, the term of this patent is extended or adjusted under 35 U.S.C. 154(b) by 191 days.

(21) Appl. No.: 11/256,270

(22) Filed: Oct. 24, 2005

(65) Prior Publication Data

US 2006/0087919 A1 Apr. 27, 2006

Related U.S. Application Data

(63) Continuation of application No. PCT/AU2004/000532, filed on Apr. 23, 2004.

(30) Foreign Application Priority Data

| | | |
|---|---|---|
| Apr. 23, 2003 | (AU) | 2003901934 |
| Oct. 30, 2003 | (AU) | 2003905974 |

(51) Int. Cl.
*G01V 3/18* (2006.01)
*G06F 19/00* (2006.01)

(52) U.S. Cl. ............................. 702/11; 702/1

(58) Field of Classification Search ............... 702/1–2, 702/13; 700/32; 703/10
See application file for complete search history.

(56) References Cited

U.S. PATENT DOCUMENTS 5,130,949 A 7/1992 Kan et al.
5,444,619 A 8/1995 Hoskins et al.
6,282,452 B1 * 8/2001 DeGuzman et al. .......... 700/32
6,681,185 B1 1/2004 Young et al.
6,980,940 B1 * 12/2005 Gurpinar et al. ............. 703/10

FOREIGN PATENT DOCUMENTS

| GB | 2340944 A | 3/2000 |
|---|---|---|
| WO | WO 03/036044 A1 | 5/2003 |
| WO | WO 03/052669 A1 | 6/2003 |

* cited by examiner

*Primary Examiner*—John Barlow
*Assistant Examiner*—Victor J. Taylor
(74) *Attorney, Agent, or Firm*—Edell, Shapiro & Finnan, LLC

(57) ABSTRACT

A method for predicting pore pressure is described which initially involves obtaining, for one point in a volume of Earth, a value of pore pressure and one or more seismic attributes. A relationship is determined between the value of pore pressure and the seismic attribute, for example by use of a neural network. Seismic data is then obtained for the volume of earth and the same attributes as selected above when determining relationship are extracted from the seismic data for another point in the volume. The extracted seismic attributes are then used as inputs to the previously determined relationship to produce as an output, a prediction of pore pressure at the other point. The seismic attributes are frequency related seismic attributes and include for example instantaneous frequency, weighted mean frequency, instantaneous pseudo-quality factor, instantaneous dominant frequency, instantaneous bandwidth, instantaneous phase, effective bandwidth, peak frequency, envelope and energy half time.

16 Claims, 12 Drawing Sheets

METHOD FOR PREDICTING PORE PRESSURE

CROSS REFERENCE TO RELATED APPLICATIONS

This application is a continuation of PCT/AU2004/000532, filed Apr. 23, 2004, and titled "Method for Predicting Pore Pressure", which claims priority under 35 U.S.C. §119 to Australian Application No. 2003901934 filed on Apr. 23, 2003, entitled "Method for Predicting Pore Pressure, and to Australian Patent Application No. 2003905974, filed on Oct. 30, 2003, entitled "Method for Predicting Pore Pressure," the entire contents of which are hereby incorporated by reference.

FIELD OF THE INVENTION

The present invention relates to a method of predicting pore pressure in sub-surface fluid reservoirs.

BACKGROUND OF THE INVENTION

Exploration and appraisal drilling for hydrocarbons, encounter a number of hazards which dictate the planning of the drilling operation and the well construction. One of these hazards is the presence of formation fluids or gases, which have a pressure anomaly known generally as "abnormal pore pressure", consisting of a difference of pore pressure to that which would be predicted from depth and density of that fluid or gas. Where the pressure is greater than expected the abnormal pore pressure is known as overpressure, and where it is less than expected the abnormal pore pressure is known as depleted pressure. It is important to predict the occurrence of such hazards ahead of time to allow for appropriate drilling fluid design, and to provide constraints on the design of the borehole size and the type and size of casing. If inadequately predicted, the effects of overpressure can extend from costly delays in drilling, non-completion of well objectives and in the extreme a loss of well through blow-out or engineering failure. Effects of depleted pressure may include loss of drilling tools in the borehole and fracture pressure of exposed Earth formations that is too low to safely remain unprotected while drilling proceeds through other Earth formations having higher fluid pressures.

Overpressure can arise from a number of causes though primarily from a restriction in the flow of pore fluid from a fluid filled reservoir during the reservoir burial history. Depleted pressures typically result from extraction of fluids from sub-surface fluid reservoirs.

The difference between total pressure or stress applied to a reservoir and pore pressure within the reservoir is called the effective stress or differential pressure, and this is related to the amount of abnormal pore pressure encountered. Low effective stress in general corresponds to areas of high abnormal pore pressure (ie overpressure) while large effective stress corresponds to areas of low overpressure.

Current methods for quantitative prediction of overpressure are derived from the relationship between velocity and effective stress as determined from empirical evaluation of in-situ stresses and velocities.

However there is uncertainty in predicting overpressure using this method which is related to the quality and source of the velocity data. If surface seismic data is used then there are levels of sophistication of processing in assessing the velocities but these are relatively expensive and computer intensive. If the source is well data there is an increased reliability of the velocity data, but its predictive value is limited since one has to drill the well in order to derive the velocity data. This information can be obtained from wells offset from a proposed drilling location.

Throughout this specification the term "comprising" is used inclusively, in the sense that there may be other features and/or steps included in the invention not expressly defined or comprehended in the features or steps subsequently defined or described. What such other features and/or steps may include will be apparent from the specification read as a whole.

Throughout this specification, except where the context required otherwise due to express language or necessary implication, the expression "seismic data" or variations such as "Seismic trace" or "seismic waveform" is used to denote data, traces or waves derived from seismic surveying including surface seismic and VSP surveying as well as wireline derived or logged data, traces or waveforms.

SUMMARY OF THE INVENTION

It is known in the art that that numerous attributes can be derived from seismic traces whether obtained via surface seismic surveying or VSP surveying. Velocity (P-wave or S-wave) data is not normally considered in the art nor is it considered for the purpose of this specification, to constitute one of these attributes.

According to one aspect of the present invention there is provided a method for predicting pore pressure comprising:
(a) obtaining by laboratory experimentation on a sample of earth for at least one point in a volume of earth, a value of pore pressure and at least one seismic attribute corresponding to that point;
(b) determining a relationship between said value of pore pressure and said at least one seismic attribute;
(c) obtaining seismic data for said volume of earth;
(d) extracting from said seismic data said at least one seismic attribute for another point in said volume;
(e) using said extracted at least one seismic attribute as respective inputs to said relationship to produce as an output, a prediction of pore pressure at said other point.

Preferably said determining a relationship comprises training an adaptive mathematical algorithm.

Preferably the adaptive mathematical algorithm comprises a neural network.

Preferably the method further comprises obtaining, for the at least one point in the volume of earth, a value of pore pressure and extracting the at least one seismic attribute from field measurements, and using the field measured value of pore pressure and at least one seismic attribute in addition to the laboratory obtained values for determining the relationship Preferably the seismic attributes comprise at least one frequency related attribute.

Preferably the at least one frequency related attribute comprises one or more of the following attributes: instantaneous frequency; weighted mean frequency; instantaneous pseudo-quality factor; instantaneous dominant frequency; instantaneous bandwidth; instantaneous phase; effective bandwidth; peak frequency; envelope; and energy half time.

Preferably, in the method a combination of one or more of the frequency related seismic attributes are used for determining the relationship and are used as inputs to the determined relationship.

Preferably said method further comprises empirically obtaining velocity data for said at least one point, using velocity data as an input for determining said relationship, extracting velocity data from the seismic data for the other point in the volume and using said extracted velocity data as an input to said determined relationship to provide a prediction of pore pressure at the other point.

Preferably the method further comprises use of anisotropic properties for determining said relationship and the subsequent input to said determined relationship to obtain a prediction of pore pressure.

According to another aspect of the present invention there is provided a method of predicting pore pressure comprising:
(a) obtaining for at least one point in a volume of Earth a value of pore pressure and at least one frequency related seismic attribute corresponding to that point;
(b) determining a relationship between the value of pore pressure and the at least one frequency related seismic attribute;
(c) obtaining seismic data for the volume of Earth
(d) extracting from the seismic data the at least one frequency related attribute for another point in the volume of Earth; and,
(e) using the extracted at least one frequency related seismic attribute as respective inputs to the relationship to produce as an output, a prediction of pore pressure at the other point.

Preferably obtaining the value of pore pressure and the at least one frequency related attribute comprises obtaining the pore pressure and attribute from laboratory experimentation or field measured seismic data, or a combination of laboratory experimentation and field measured seismic data.

According to the present invention there is provided a method for predicting pore pressure comprising the steps of:
(a) obtaining for at least one point in a volume of earth, a value of pore pressure and at least one seismic attribute corresponding to that point;
(b) training an adaptive mathematical algorithm to recognise relationships between said value of pore pressure and said at least one seismic attribute;
(c) obtaining seismic data for said volume of Earth;
(d) extracting from said seismic data said at least one seismic attribute for another point in said volume;
(e) using said extracted at least one seismic attribute as respective inputs to said trained adaptive mathematical algorithm and operating said trained adaptive mathematical algorithm to produce as an output, a prediction of pore pressure at said other point.

BRIEF DESCRIPTION OF THE DRAWINGS

An embodiment of the present invention will now the described by way of example only with reference to the accompanying drawings, in which:

FIG. 1 is presentation of normalised instantaneous frequency versus differential pressure for a range of sandstone samples;

FIG. 2 presents normalised weighted mean frequency versus differential pressure for a range of sandstone samples;

FIG. 3 presents instantaneous frequency, derived from vertically propagating compression waves through a laboratory shale sample versus mean effective stress;

FIG. 4 presents normalised instantaneous frequency versus mean effective stress for the laboratory shale sample;

FIG. 5 presents normalised laboratory derived data and field data for a shale;

FIG. 6 presents a log-linear curve-fit to the laboratory and field derived instantaneous frequencies versus mean effective stress for a shale;

FIG. 7 presents a log-linear curve-fit to the laboratory derived instantaneous frequencies;

FIG. 8 presents log-linear curve-fit to the laboratory derived normalised instantaneous frequencies;

FIG. 9 presents a comparison of normalised field data with the laboratory derived trend;

DETAILED DESCRIPTION OF THE PREFERRED EMBODIMENTS OF THE INVENTION

Embodiments of the present invention are based on a discovery that there appears to exist relationships between some seismic attributes, and in particular frequency related attributes and pore pressure of Earth formations. These attributes comprise but are not limited to the following: instantaneous frequency; weighted mean frequency; instantaneous pseudo-quality factor; instantaneous dominant frequency; instantaneous bandwidth; instantaneous phase; effective bandwidth; peak frequency; envelope; and energy half time. The discovery of the existence of relationships between the particular seismic attributes and the pore pressure was made as a result of performing laboratory experiments on samples of various Earth formations under precisely controlled fluid pressure and confinement pressure conditions. A possible advantage of using laboratory determination of the relationship between pore pressure and seismic attributes is substantial reduction in uncertainty as to which seismic attributes are most sensitive to pore pressure, and which are relatively insensitive to pore pressure. Because of the number of uncontrollable variables relating to field measurements of pore pressure and seismic attributes, a substantial uncertainty may exist in pore pressure estimates made only from field measurements, particularly with respect to which seismic attributes provide the most reliable correlation between to the pore pressure. Moreover, the confining pressure (overburden) can be measured and precisely controlled in the laboratory, whereas pore pressure estimation techniques relying solely on field data analysis may not be able to account for variations in such confining pressures. As a result, it is believed that by laboratory determination of relationships between the various seismic attributes and pore pressure, uncertainties which exist in estimation techniques using only field data analysis may be substantially reduced or even eliminated. Uncertainties as to which seismic attributes are most sensitive to pore pressure may also be substantially reduced. Nevertheless, in view of the discovered relationship between particular seismic attributes and pore pressure, embodiments of the present invention may be realised by obtaining the value of pore pressure and one or more of the abovementioned frequency related seismic attributes either from laboratory experiments, field data or a combination of laboratory experimentation and field data.

Figure 15:
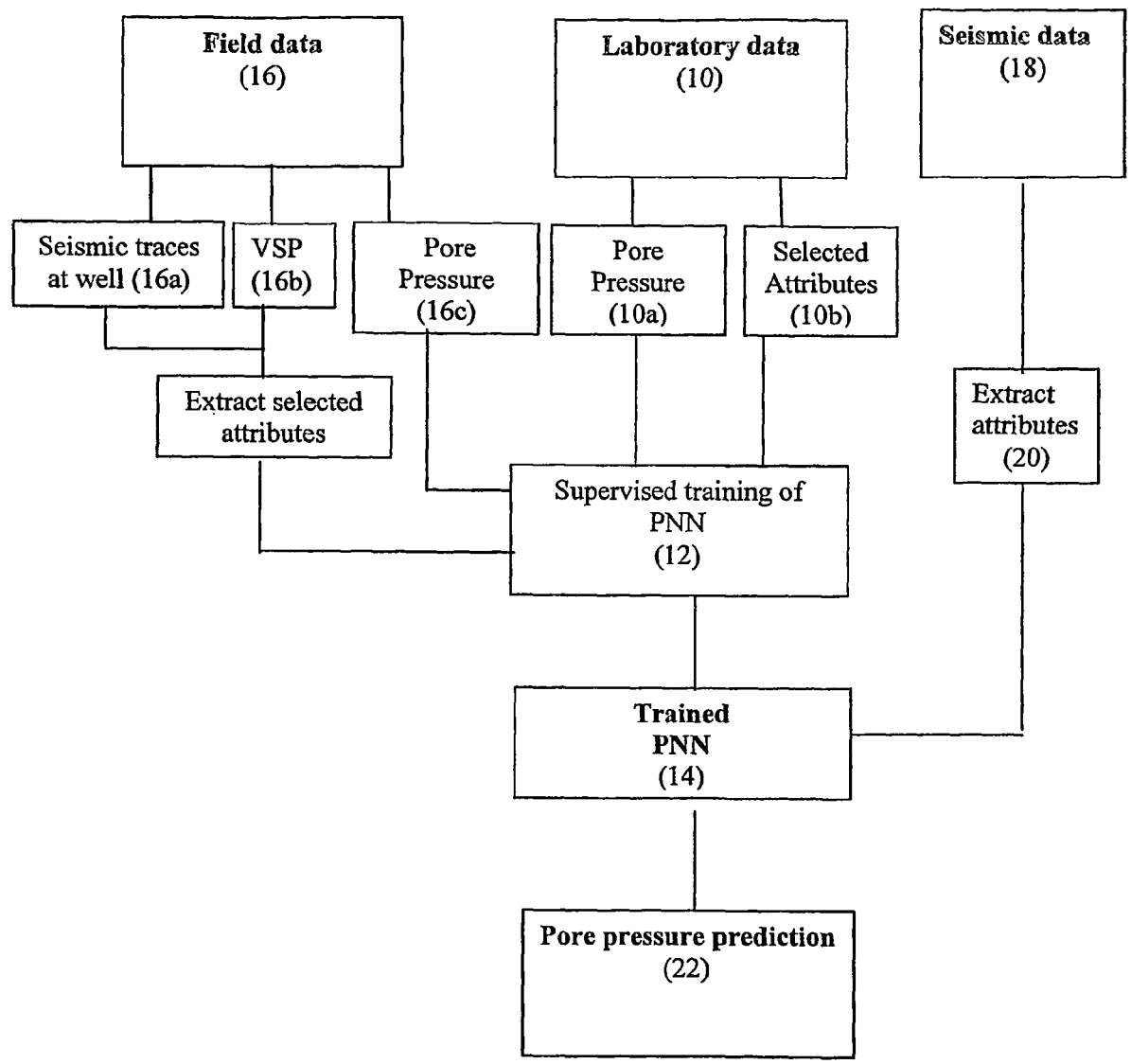
FIG. 15 is a flow chart representation of an embodiment of the method for predicting pore pressure.

FIG. 15 depicts an embodiment of the method for predicting pore pressure. Initially at 10 laboratory tests are conducted on a sample of a reservoir formation for the purposes of measuring pore pressure and one or more seismic attributes. The laboratory measured pore pressure (10a) is used as an output, and selected seismic attributes (10b) are provided as inputs at 12 to an adaptive mathematical algorithm in the form of a perceptron neural network (PNN) (shown separately in FIG. 10) for the purposes of training the PNN to recognise relationships between the pore pressure (10a) and the selected seismic attributes (10b). This results in a trained PNN (or a determined relationship) at 14. If desired seismic data which include measurements related to the reservoir formation may also be provided at 16 as inputs and outputs for the purposes of training the PNN. Seismic data is obtained at 18 by conventional methods for the volume of earth occupied by the reservoir. Using known mathematical algorithms (discussed in brief herein below) seismic attributes corresponding to those used in the PNN training 12 are extracted at 20. The extracted attributes are the applied as inputs to the trained PNN at 14. The trained PNN produces as an output 22, a prediction of pore pressures for the reservoir.

The present embodiment includes determining a relationship between measured pore pressure and the one or more selected seismic attributes by training an PNN. It should be understood that deterministic methods, such as defining a specific algorithm, can be used in other embodiments as a way to determine the relationship between the measured pore pressure and the seismic attributes. Training an PNN to recognise the relationships is therefore only one embodiment, and is not intended to limit the scope of the invention.

In order to avoid confusion or misinterpretation throughout this specification the relationship between effective stress, differential pressure and pore pressure are deemed to be as follows:

Effective stress and differential pressure are one and the same for the purpose of this description. They are both defined simply as the difference between the reservoir confining pressure (due to the overburden of earth above the reservoir) and the pressure within the pores of the reservoir rock (the pore pressure).

One embodiment of making the laboratory measurements for determining the relationship can be explained as follows. Samples of the particular formation are saturated with either the in-situ saturating fluid ("connate fluid") or a synthetic fluid of substantially the same composition as reservoir fluid from which the sample is taken. The samples are encased in a synthetic rubber membrane that may incorporate additional elements of an ultrasonic transducer array. The encased core sample forms a cell which is placed between loading platens that also contain ultrasonic transducers. The cell can be loaded tri-axially with an independent control so that cell pressure and pore pressures can be adjusted to simulate various stress paths simulating normal compaction, dis-equilibrium compaction and fluid generation. Ultrasonic waveforms are recorded at each pressure when and only when the pore pressures have equilibriated. In the event of elastically isotropic sandstones, axially transmitted ultrasonic pulses, both P-wave and S-wave, are typically sufficient for subsequent recording and analysis. With elastically anisotropic rocks such as shales, ultrasonic pulses should be transmitted axially, cross-diameter and at a sufficient number of off axis directions and polarisations to enable the calculation of a full set of elastic constants. Recorded waveforms are processed to extract the required attributes and in the case of shale derived waveforms, additional anisotropic parameters such as the Thomsen constants can be calculated.

Ideally, the waveform recording is via a high resolution digital recorder with a sampling rate of up to 10 Mega samples per second).

There are over 100 well known instantaneous attributes. A selection of these instantaneous attributes are set out below. The instantaneous attributes are computed sample by sample from a digital representation of a seismic signal and represent instantaneous variations of various parameters. Instantaneous values of attributes such as trace envelope, its derivatives, frequency and phase may be determined from complex traces. If a seismic trace is defined by the following equation:

$$F(t) = f(t) + ig(t), \text{ then:}$$

then the envelope E(t) is the modulus of the of the complex function;

$$E(t) = \sqrt{[f(t)^2 + g(t)^2]} \qquad (1)$$

The envelope represents the total instantaneous energy and its magnitude is of the same order as that of the input traces.

Other seismic attributes that have been shown by laboratory experimentation to have a strong relationship to pore pressure include the following:

Instantaneous Phase (2)

$$Ph(t) = \arctan\left[\frac{g(t)}{f(t)}\right]$$

Instantaneous Frequency (3a)

$$Freq(t) = \frac{\partial Ph(t)}{\partial t}$$

$$Freq(t) = \frac{\partial \arctan[g(t)/f(t)]}{\partial t} = \frac{[f(t) \cdot dg/dt - g(t) \cdot df/dt]}{[f(t)^2 + g(t)^2]} \qquad (3b)$$

Weighted Mean Frequency (4)

$$\langle Freq(t) \rangle = \frac{\sum_T E(t) \cdot Freq(t)}{\sum_T E(t)}$$

Instantaneous Band Width (5)

$$\sigma(t)^2 = \frac{dE(t)/dt}{2\pi \cdot E(t)}$$

Instantaneous Pseudo-Quatlity Factor $q$ (6)

$$q(t) = \frac{-\pi Freq(t)}{\frac{\partial E(t)/\partial t}{E(t)}} = \frac{-\pi Freq(t) \cdot E(t)}{\partial E(t)/\partial t}$$

Instantaneous Dominant Frequency (7)

$$Freq_{rms}(t)^2 = Freq(t)^2 + \sigma(t)^2$$

Auto correlation Function (8)

$$Acf(t) = \frac{\sum_{\tau=0}^{N}[f(\tau) - \langle f(\tau) \rangle][f(\tau+t) - \langle f(\tau) \rangle]}{\sum_{\tau=0}^{N}[f(\tau) - \langle f(\tau) \rangle]^2}$$

Both the mean of the first auto correlation function coefficients and the first zero-crossing point of time-axis have been used as the attributes determined from the waveforms. In some embodiments of a method according to the invention, the above attributes are determined with respect to the various pressures on samples measured in the laboratory.

FIGS. 1-9 graphically depict the relationship between various seismic attributes and differential pressure or effective stress for different test sites obtained by conducting experimentation of samples of earth. The process of normalisation shown in FIG. 9 consists of dividing frequency-based attributes by a central frequency, consequently removing any scale dependence, thereby facilitating direct comparisons between laboratory and field data.

Figure 1:
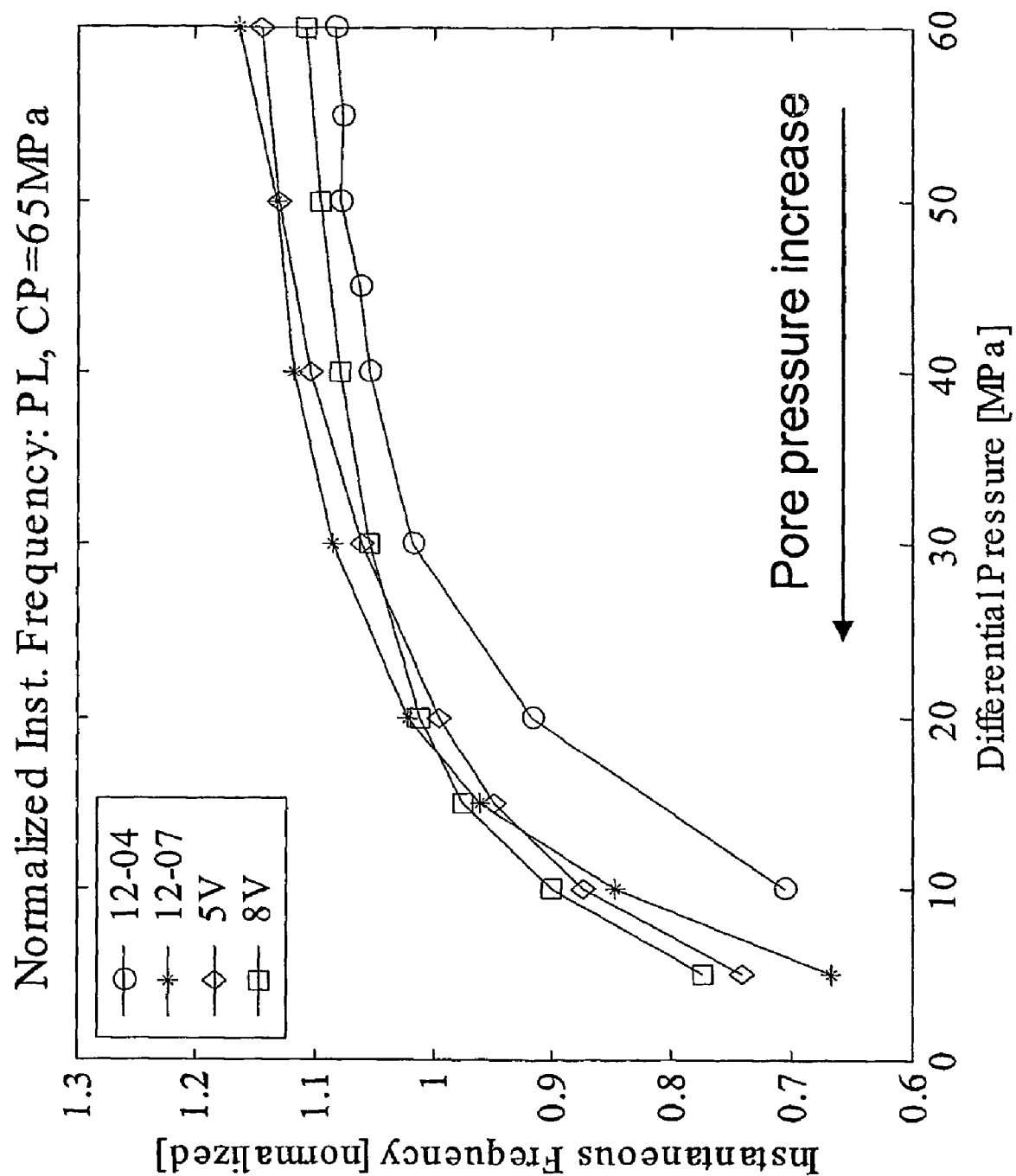
FIGS. 1-9 depict graphically the relationship between various seismic attributes and pore pressure or effective stress and in particular.
Figure 2:
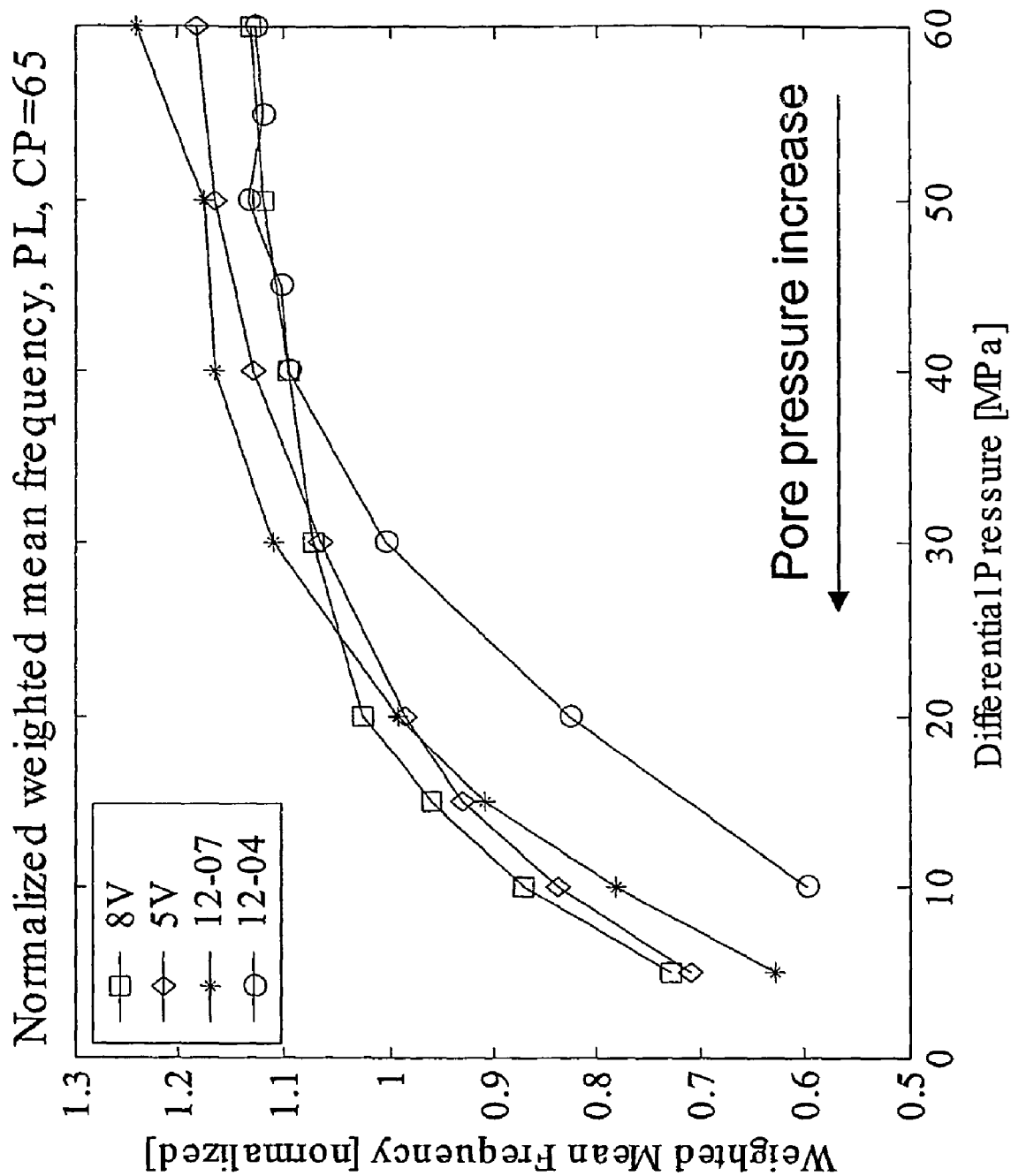
Figure 3:
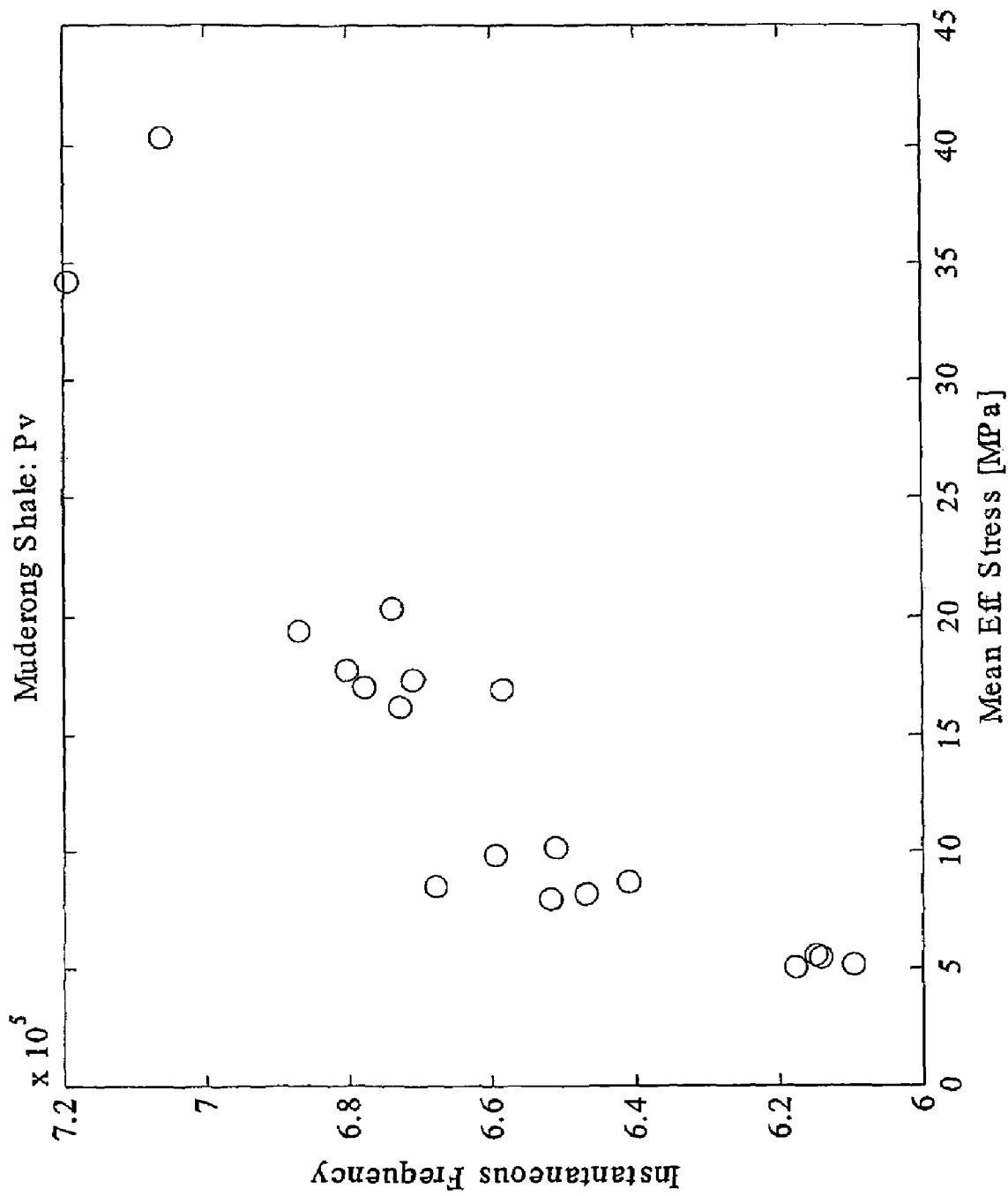
Figure 4:
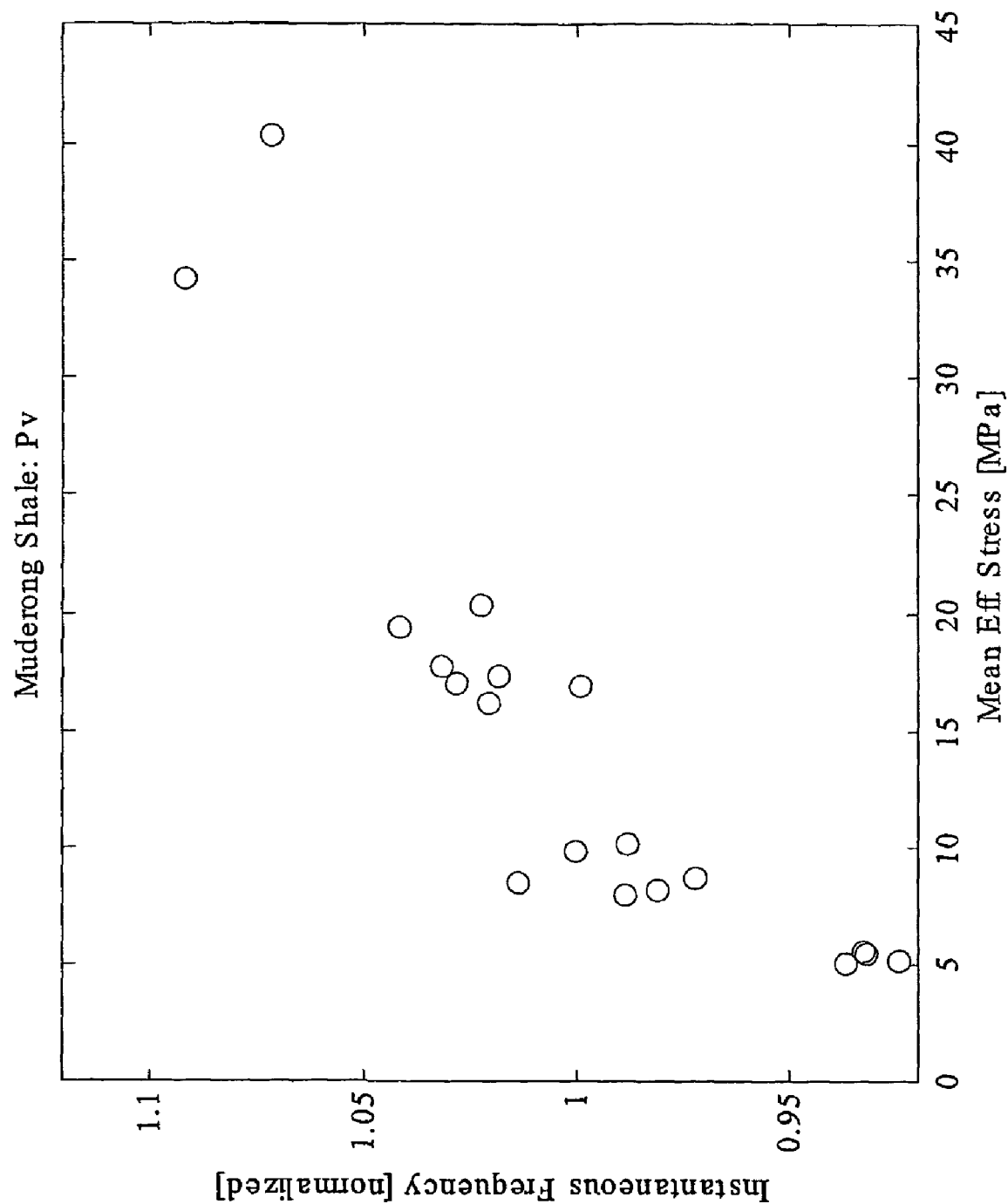
Figure 5:
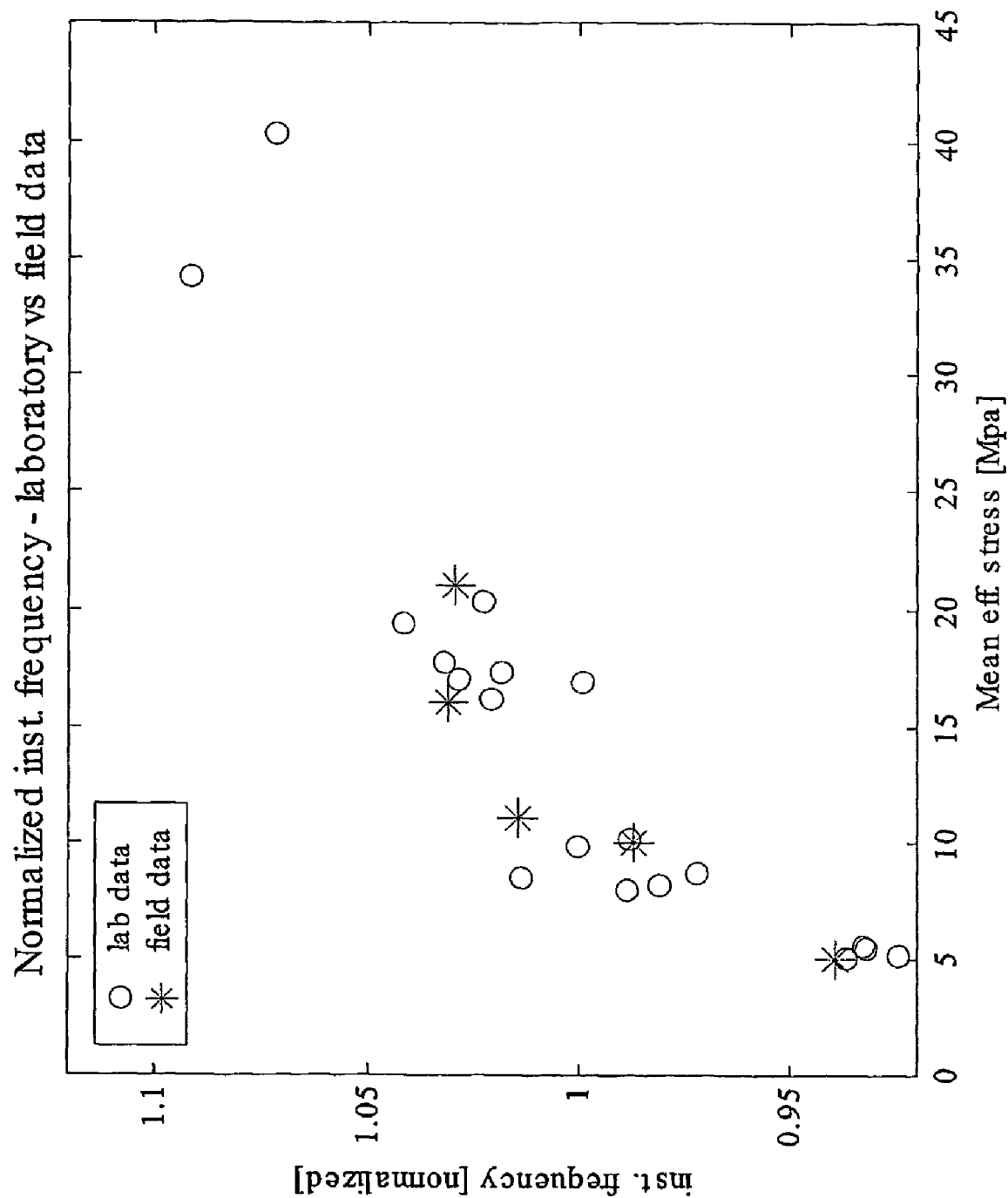
Figure 6:
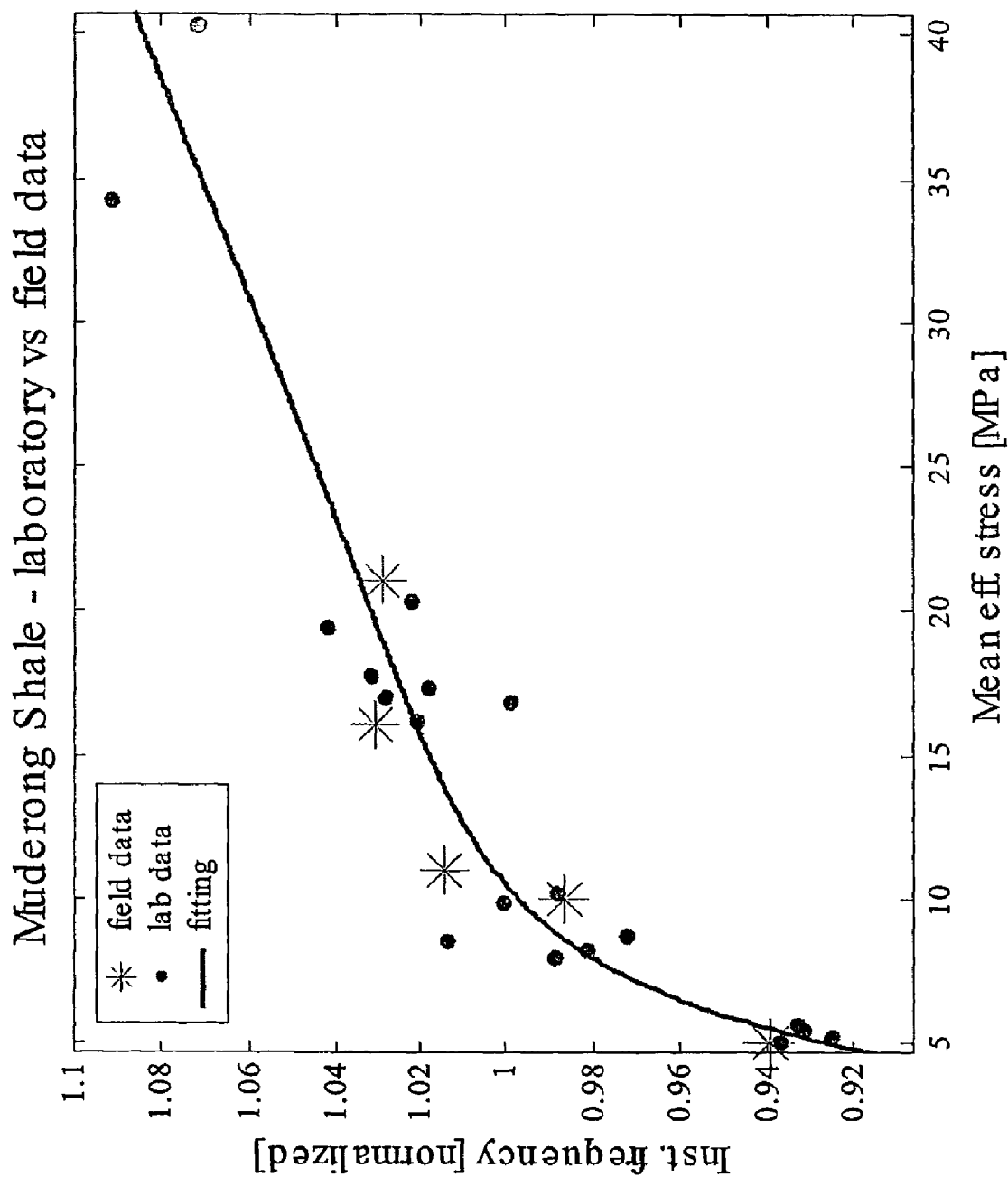
Figure 7:
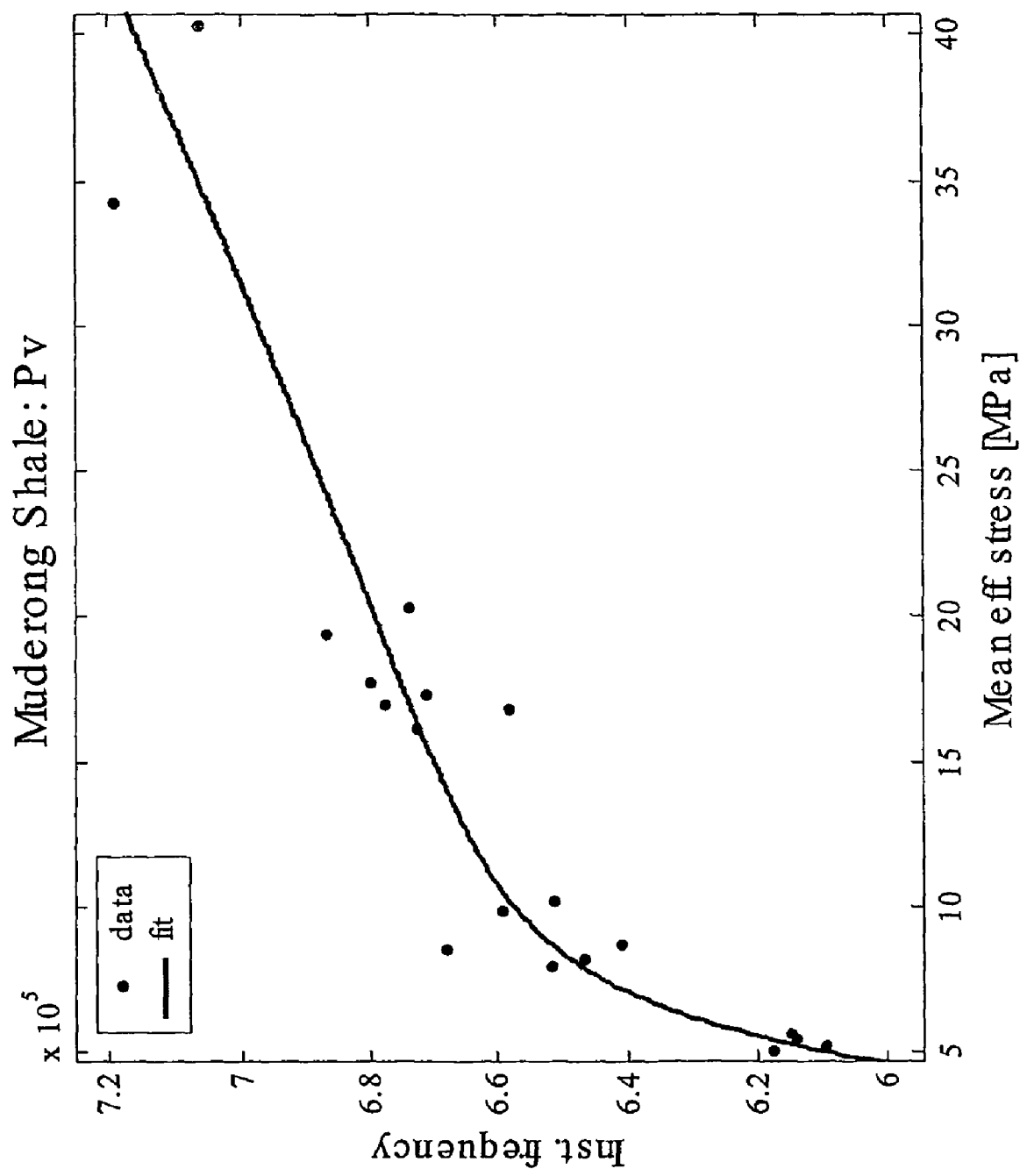
Figure 8:
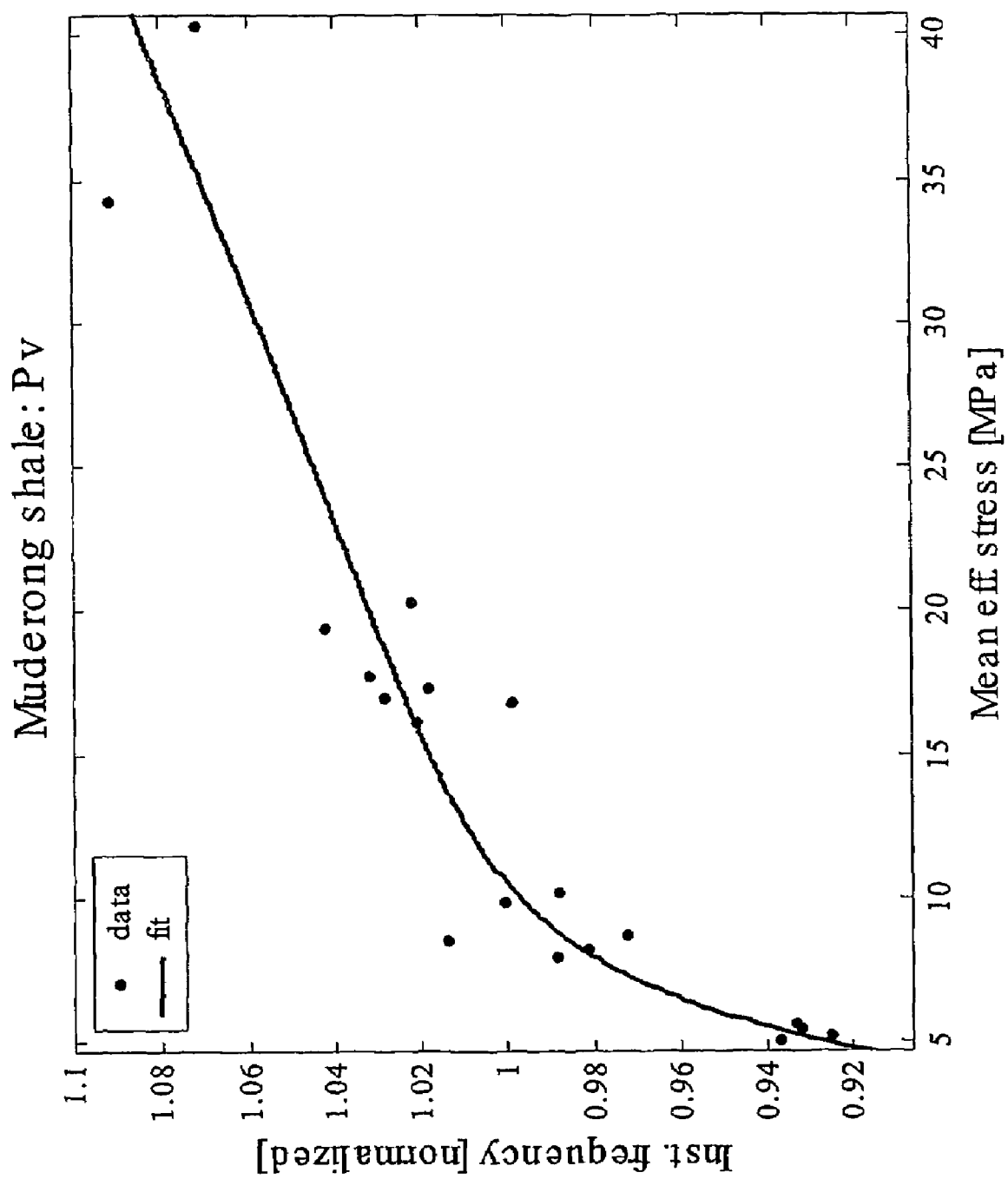
Figure 9:
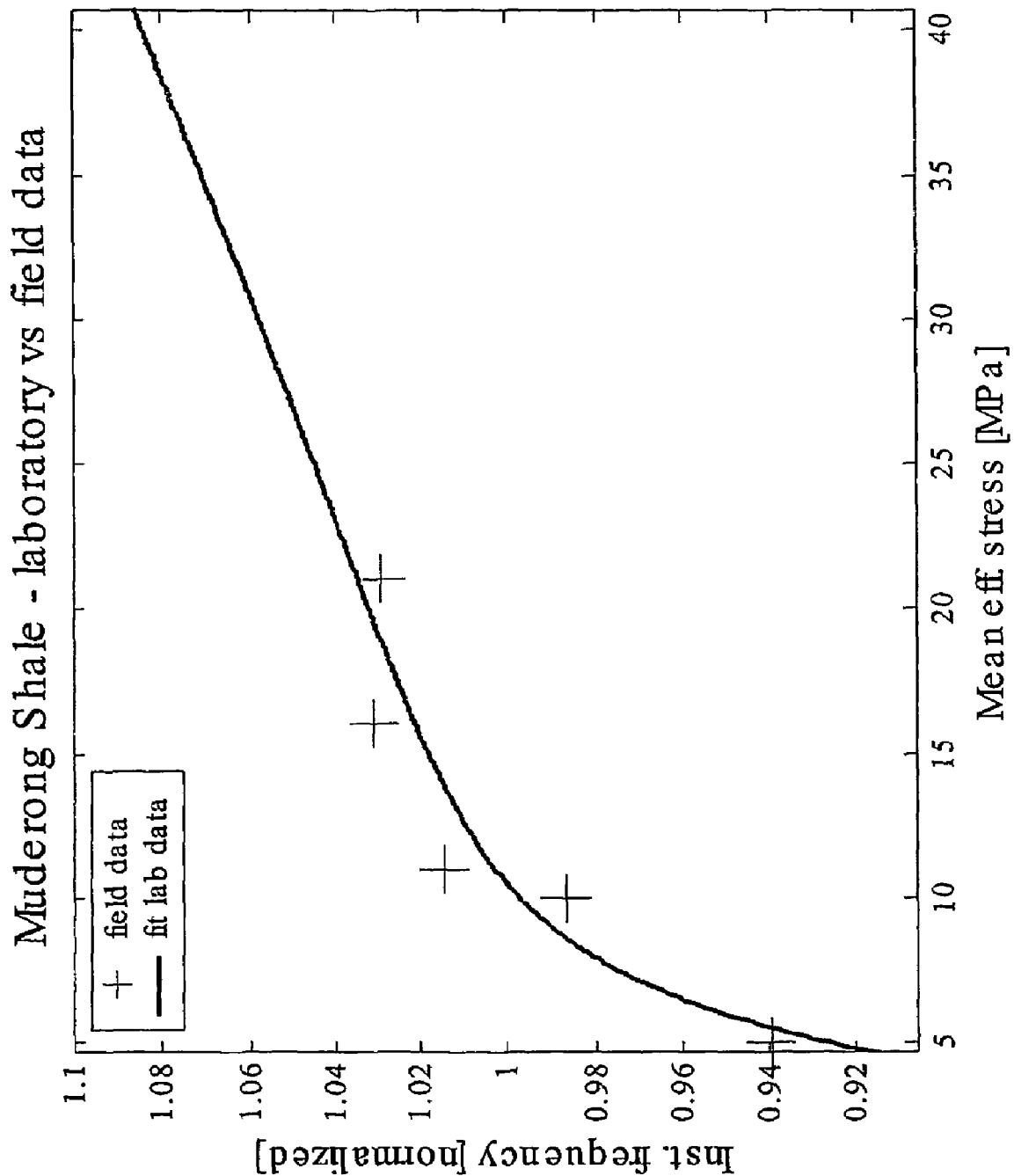
Figure 10:
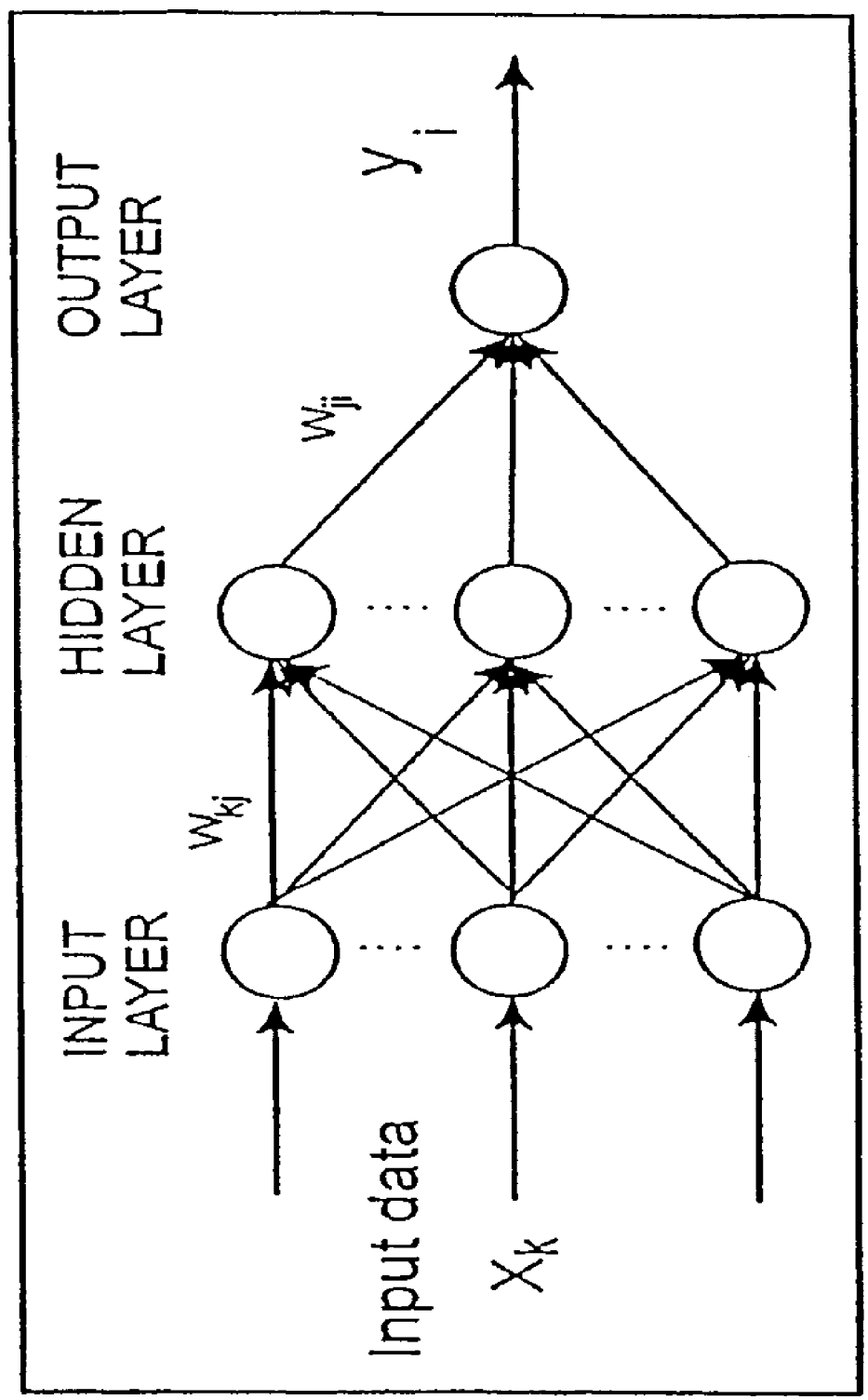
FIG. 10 is a representation of the typical architecture of a multi-layer perceptron neural network.

FIG. 10 provides a graphical representation of an adaptive multi-layer perceptron neural network that may be used in some embodiments of the invention. In the present embodiment, the input data to the neural network includes one or more of the abovementioned attributes, with the output being the predicted pore pressure. All input neurons are connected to all hidden neurons and all hidden neurons are connected to all output neurons with weighted connections. The number of input layer neurons is equal to the number of data inputs, the number of hidden neurons is arbitrary and the number of output layer neurons is equal to the number of predicted values, which in this case is only one neuron, being an estimate of pore or differential pressured.

The operation and function of neural networks is well known in the art and accordingly will not be discussed in any further detail.

As mentioned above data used for training of the neural network is derived from a laboratory recreation of subsurface conditions, using for example core samples, and wave forms acquired in that environment. The better the quality of the data, the better the training process and thus the predicted pore pressure. The training process may be supplemented by using data from empirical measurements in a field, in addition to the laboratory derived data. In particular, one can correlate particular trace attributes at a particular time or equivalent depth with the property as observed in subsurface data, ie, logging or drilling information. That is, a receiver trace and a known seismic energy source position can be associated with borehole (well) location and the appropriate time position of a known measure of over pressure in well data can be examined. It should be recognised however that there is a certain level of error in this association. In this regard, it is better to use the same type of source-receiver pair, but where one of the end points (either the source or receiver position) is placed next to the point where the property is observed, ie, using vertical seismic profile (VSP) geometries.

In addition to the use of the above-mentioned attributes other characteristics may be used to assist in predicting pore pressure. More particularly, embodiments of the present invention do not exclude the use of velocity to assist in predicting pore pressure. In this regard, a velocity prediction using surface seismic data as well as VSP data may be used to enhance pore pressure prediction. In addition properties such as acoustic impedance and anisotropic attributes may be used as inputs to the neural network for predicting pore pressure.

There are further properties of VSPs which may be exploited to assist in predicting pore pressure. The VSP has unique properties different to surface seismic. It is known to use VSP to determine the in situ velocity, by recording arrival times as a function of depth of a receiver in a well.

However other properties of VSPs have not been well exploited. Unlike surface seismic, measurements relating to the propagation of seismic energy can be for transmitted energy as well as reflected energy. Thus a comparison can be made between the attributes of a signal at two locations even if they are metres apart, against other measures of these properties. The reflected signal may also be utilised, which is equivalent to the surface seismic method, if it was acquired directly above the interval. Analysis can also be made of the attributes of the signals "down going" as well as "up going" and a comparison made to measure over pressure.

Figure 11:
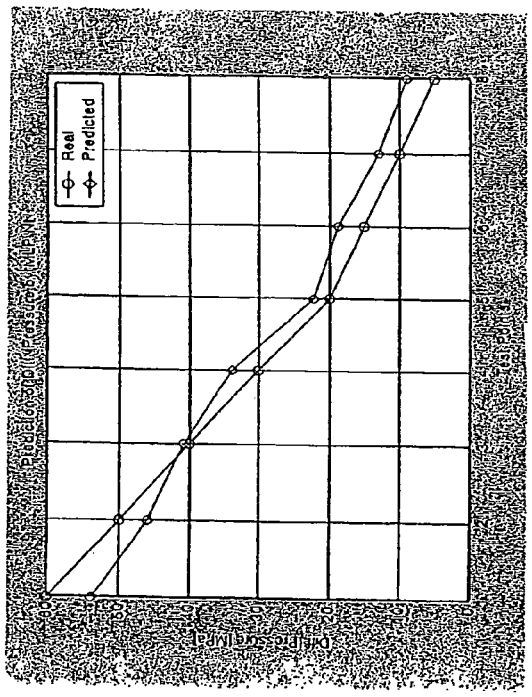

FIGS. 11-14 graphically illustrate the prediction of differential (pore) pressure using the embodiments of the present invention. In FIG. 11, the following attributes and characteristics were used as inputs to the neural network: instantaneous frequency; weighted mean frequency; instantaneous pseudo-quality factor; zero crossing index of auto correlation function; mean of auto correlation coefficients; acoustic impedance. Three test sites were used for training the neural network. Data from a fourth site was then used as inputs to the trained neural network to produce a predicted differential pressure. This is plotted against actual differential pressure at the fourth test site.

Figure 12:
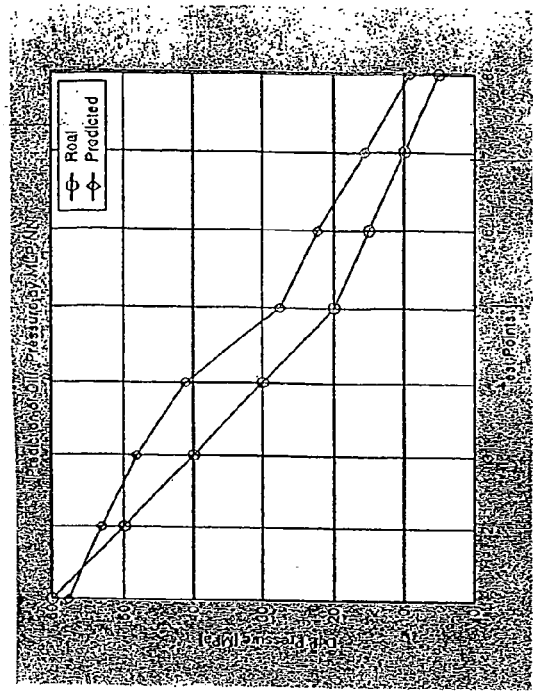
FIGS. 11-14 graphically illustrate the relationship between predicted pore pressure using embodiments of the present invention and actual pore pressure.

FIG. 12 illustrates a prediction of pore pressure this time using as inputs to the neural network weighted mean frequency; instantaneous pseudo-quality factor; zero crossing index of auto correlation function; and acoustic impedance. The neural network was trained using data from two test sites.

Figure 13:
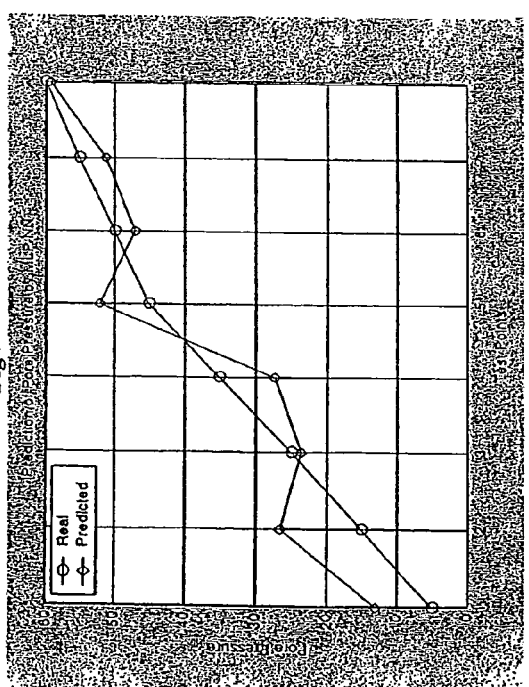

In FIG. 13, the inputs to the neural network were instantaneous frequency; weighted mean frequency; instantaneous pseudo-quality factors; zero-crossing index of auto correlations function; and mean of auto correlation coefficients. Three test sites were used for training of the neural network.

Figure 14:
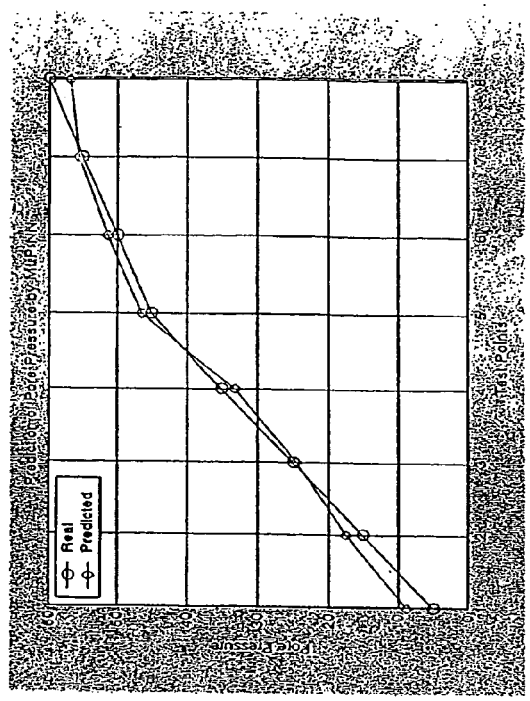

Finally, in FIG. 14, the inputs to the neural network were instantaneous frequency; weighted mean frequency; zero-crossing index of auto correlations function; mean of auto correlation coefficients; and acoustic impedance, with the training conducted using the above three test sites. Embodiments of the present invention provide for the first time an additional quantitative method for estimating pore pressure which is based on seismic attributes rather than on seismic velocity. This has several inherent advantages including:

(a) high speed since it is based on VSP and post-stack data analysis;
(b) relatively easy to implement;
(c) uses several attributes rather than just one and relates them through a neural network;
(d) less sensitive to noise and hence suitable for deeper targets.

Further, it should be appreciated that embodiments of the present invention allow for a three-dimensional seismic data set to be decomposed into sets of attributes and then, having established a relationship between pore pressure and any of those attributes, the attribute volume can be replaced with or recast as a volume of predicted pore pressure.

Variations and modifications to embodiments of the present invention as would be apparent to those of ordinary skill in the art are deemed to be within the scope of the present invention.

The invention claimed is:

1. A method for predicting pore pressure comprising:
   (a) obtaining by laboratory experimentation on a sample of earth for at least one point in a volume of earth, a value of pore pressure and at least one seismic attribute corresponding to that point;
   (b) determining a relationship between said value of pore pressure and said at least one seismic attribute;

(c) obtaining seismic data for said volume of earth;

(d) extracting from said seismic data said at least one seismic attribute for another point in said volume;

(e) using said extracted at least one seismic attribute as respective inputs to said relationship to produce as an output, a prediction of pore pressure at said other point.

2. The method according to claim 1 wherein the seismic attributes comprised at least one frequency related attribute.

3. The method according to claim 2 wherein the at least one frequency related attribute comprises one or more of the following attributes: instantaneous frequency; weighted mean frequency; instantaneous pseudo-quality factor; instantaneous dominant frequency; instantaneous bandwidth; instantaneous phase; effective bandwidth; peak frequency; envelope; and energy half time.

4. The method according to claim 3 wherein a combination of one or more of the frequency related seismic attributes is used for determining the relationship and are used inputs to the determined relationship.

5. The method according to claim 1 further comprising empirically obtaining velocity data for said at least one point, using velocity data as an input for determining said relationship, extracting velocity data from the seismic data for the other point in the volume and using said extracted velocity data as an input to said determined relationship to provide a prediction of pore pressure at the other point.

6. The method according to claim 1 further comprising use of anisotropic properties for determining said relationship and the subsequent input to said determined relationship to obtain a prediction of pore pressure.

7. The method according to claim 1 further comprising obtaining, for the at least one point in the volume of Earth, a value of pore pressure and extracting the at least one seismic attribute from field measurements, and using the field measured value of pore pressure and at least one seismic attribute in addition to the laboratory obtained values for determining the relationship.

8. The method according to claim 1 wherein determining a relationship comprises training an adaptive mathematical algorithm.

9. The method according to claim 8 wherein the adaptive mathematical algorithm comprises a neural network.

10. A method for predicting pore pressure comprising:
(a) obtaining for at least one point in a volume of Earth a value of pore pressure and at least one frequency related seismic attribute corresponding to that point;
(b) determining a relationship between the value of pore pressure and the at least one frequency related seismic attribute;
(c) obtaining seismic data for the volume of Earth
(d) extracting from the seismic data the at least one frequency related attribute for another point in the volume of Earth; and,
(e) using the extracted at least one frequency related seismic attribute as respective inputs to the relationship to produce as an output, a prediction of pore pressure at the other point.

11. The method according to claim 10 wherein obtaining the value of pore pressure and the at least one frequency related attribute comprises obtaining the pore pressure and attribute from laboratory experimentation or field measured seismic data, or a combination of laboratory experimentation and field seismic data.

12. The method according to claim 10 wherein at least one frequency related attribute comprises one or more of the following attributes: instantaneous frequency; weighted mean frequency; instantaneous pseudo-quality factor; instantaneous dominant frequency; instantaneous bandwidth; instantaneous phase; effective bandwidth; peak frequency; envelope; and energy half time.

13. The method according to claim 12 wherein a combination of one or more of the frequency related seismic attributes is used for determining the relationship and are used inputs to the determined relationship.

14. The method according to claim 10 further comprising empirically obtaining velocity data for said at least one point, using velocity data as an input for determining said relationship, extracting velocity data from the seismic data for the other point in the volume and using said extracted velocity data as an input to said determined relationship to provide a prediction of pore pressure at the other point.

15. The method according to claim 10 further comprising use of anisotropic properties for determining said relationship and the subsequent input to said determined relationship to obtain a prediction of pore pressure.

16. A method for predicting pore pressure comprising the steps of:
(a) obtaining for at least one point in a volume of earth, a value of pore pressure and at least one seismic attribute corresponding to that point;
(b) training an adaptive mathematical algorithm to recognise relationships between said value of pore pressure and said at least one seismic attribute;
(c) obtaining seismic data for said volume of Earth;
(d) extracting from said seismic data said at least one seismic attribute for another point in said volume;
(e) using said extracted at least one seismic attribute as respective inputs to said trained adaptive mathematical algorithm and operating said trained adaptive mathematical algorithm to produce as an output, a prediction of pore pressure at said other point.

* * * * *